United States Patent
Gran et al.

(10) Patent No.: US 11,420,878 B2
(45) Date of Patent: Aug. 23, 2022

(54) METHODS FOR REMOVAL OF LEAD AND/OR OTHER CONTAMINANTS FROM LIMESTONE AND RESULTANT CALCIUM OXIDE

(71) Applicant: MISSISSIPPI LIME COMPANY, St. Louis, MO (US)

(72) Inventors: Martin L. Gran, Chesterfield, MO (US); Randy Griffard, St. Mary, MO (US); Mary Grass, Ste. Genevieve, MO (US)

(73) Assignee: Mississippi Lime Company, St. Louis, MO (US)

( * ) Notice: Subject to any disclaimer, the term of this patent is extended or adjusted under 35 U.S.C. 154(b) by 117 days.

(21) Appl. No.: 16/795,306

(22) Filed: Feb. 19, 2020

(65) Prior Publication Data

US 2020/0262710 A1     Aug. 20, 2020

Related U.S. Application Data

(60) Provisional application No. 62/807,556, filed on Feb. 19, 2019.

(51) Int. Cl.
*C01F 11/00*     (2006.01)
*C01F 11/06*     (2006.01)
*C04B 2/10*      (2006.01)

(52) U.S. Cl.
CPC ............... *C01F 11/06* (2013.01); *C04B 2/10* (2013.01); *C01P 2006/80* (2013.01)

(58) Field of Classification Search
CPC ......... C01F 11/06; C04B 2/10; C01P 2006/80

USPC ....................................................... 423/637
See application file for complete search history.

(56) References Cited

U.S. PATENT DOCUMENTS

| | | |
|---|---|---|
| 2,021,663 A | 11/1935 | Knox, Jr. |
| 2,127,626 A | 8/1938 | Block |
| 4,748,010 A | 5/1988 | Walker |
| 6,926,879 B2 | 8/2005 | Huege et al. |
| 2005/0031515 A1* | 2/2005 | Charette ................ B01D 53/83 423/244.07 |
| 2007/0104630 A1 | 5/2007 | Huege |
| 2008/0090035 A1 | 4/2008 | Baune et al. |
| 2011/0100843 A1 | 5/2011 | Cannet et al. |
| 2017/0320743 A1 | 11/2017 | Stamp |

OTHER PUBLICATIONS

Applications Note, Insight to Color publication, "Hunter Lab Color Scale," published by HunterLab, Aug. 1-15, 1996, vol. 8, No. 9, (4 pages).
Stoiber, Roman, "Slakers and movers," Lime Slaking, International Cement Review, Jul. 2015, STT Enviro. Corp. Systems & Solutions, Canada (3 pages).
International Search Report and Written Opinion issued for related Application No. PCT/US2020/018867, dated Jun. 18, 2020, 10 pages.

* cited by examiner

*Primary Examiner* — Steven J Bos
(74) *Attorney, Agent, or Firm* — Lewis Rice LLC

(57) ABSTRACT

Systems and methods for impurity removal to limestone using modifications to the typical calcination process of turning calcium carbonate into calcium oxide. Specifically, substantially increasing the temperature to 1100° C. or higher and increasing soak time can result in reductions in certain undesirable impurities, particularly with regards to lead and lead compounds.

20 Claims, 3 Drawing Sheets

| Limestone Brightness | L70 | L60 | L50 | L40 |
|---|---|---|---|---|
| Lead (ppm) | 0.26 | 0.35 | 0.43 | 0.61 |
| Cesium (ppm) | 0.13 | 0.11 | 0.13 | 0.16 |
| Potassium (ppm) | 11 | 41 | 91 | 120 |
| Cadmium (ppm) | 0.5 | 0.45 | 0.47 | 0.56 |
| Rubidium (ppm) | 0.14 | 0.23 | 0.51 | 0.71 |

FIG. 1

| Calcination Temperature (2 hour soak) | Original (L70) | 1100° C | 1200° C | 1300° C | 1400° C |
|---|---|---|---|---|---|
| Lead (ppm) | 0.33 | 0.41 | 0.31 | 0.19 | 0.13 |
| Cesium (ppm) | 0.2 | 0.35 | 0.32 | 0.28 | 0.24 |
| Potassium (ppm) | 16 | 37 | 31 | 18 | 8 |
| Cadmium (ppm) | 0.34 | 0.77 | 0.46 | 0.40 | 0.45 |
| Rubidium (ppm) | 0.1 | 0.13 | 0.13 | 0.09 | <0.02 |

FIG. 2

| Calcination Temperature (2 hour soak) | Original | 1100° C | 1200° C | 1300° C | 1400° C |
|---|---|---|---|---|---|
| Lead (ppm) | | | | | |
|    Darker (<L60) | 0.28 | 0.59 | 0.40 | 0.23 | 0.14 |
|    Lighter (>L60) | 0.44 | 0.51 | 0.35 | 0.19 | 0.12 |
| Potassium (ppm) | | | | | |
|    Darker (<L60) | 17 | 140 | 120 | 120 | 62 |
|    Lighter (>L60) | 44 | 76 | 55 | 27 | <10 |
| Cadmium (ppm) | | | | | |
|    Darker (<L60) | 0.32 | 0.88 | 0.63 | 0.60 | 0.51 |
|    Lighter (>L60) | 0.39 | 0.57 | 0.54 | 0.52 | 0.49 |
| Rubidium (ppm) | | | | | |
|    Darker (<L60) | 0.10 | 0.48 | 0.43 | 0.39 | 0.12 |
|    Lighter (>L60) | 0.26 | 0.27 | 0.21 | 0.11 | 0.05 |

FIG. 3

L52 Limestone

| Calcination Temperature (2 hour soak) | Original | 1200 °C | 1300 °C | 1400 °C | 1500 °C | 1600 °C |
|---|---|---|---|---|---|---|
| Cadmium (ppm) | 0.58 | 0.52 | 0.50 | 0.39 | 0.32 | 0.17 |
| Cerium (ppm) | 1.2 | 2.6 | 2.4 | 2.5 | 2.4 | 2.3 |
| Cesium (ppm) | 0.06 | 0.07 | ND | ND | ND | ND |
| Cobalt (ppm) | 0.15 | 0.24 | 0.28 | 0.23 | 0.30 | 0.32 |
| Copper (ppm) | 0.96 | 1.4 | 1.2 | 0.90 | 1.0 | 1.2 |
| Lead (ppm) | 0.37 | 0.34 | 0.20 | 0.08 | ND | ND |
| Lead and Compounds (ppm) | 0.39 | 0.38 | 0.24 | 0.09 | ND | ND |
| Lithium (ppm) | 0.9 | 2.8 | 2.3 | 1.2 | 1.8 | 1.5 |
| Potassium (ppm) | 110 | 790 | 300 | 56 | ND | ND |
| Rubidium (ppm) | 0.54 | 2.7 | 0.94 | 0.16 | 0.05 | 0.04 |
| Silver (ppm) | 0.05 | 0.07 | 0.05 | ND | ND | ND |
| Sodium (ppm) | 140 | 240 | 190 | 140 | 130 | 90 |
| Thorium (ppm) | 0.14 | 0.27 | 0.23 | 0.21 | 0.19 | 0.19 |
| Zinc (ppm) | 34 | 22 | 23 | 22 | 28 | 22 |
| Fluoride (ppm) | 93 | 82 | 63 | 73 | 43 | 37 |

FIG. 4

L55 Limestone

| Calcination Temperature (2 hour soak) | Original | 1200 °C | 1300 °C | 1400 °C | 1500 °C | 1600 °C |
|---|---|---|---|---|---|---|
| Cadmium (ppm) | 0.45 | 0.94 | 0.89 | 0.65 | 0.53 | 0.24 |
| Cerium (ppm) | 1.3 | 2.1 | 2 | 2.3 | 2.2 | 2.4 |
| Cesium (ppm) | 0.04 | 0.016 | ND | ND | ND | ND |
| Cobalt (ppm) | 0.063 | 0.084 | 0.097 | 0.094 | 0.11 | 0.092 |
| Copper (ppm) | 0.58 | 0.49 | 0.51 | 0.55 | 0.54 | 0.46 |
| Lead (ppm) | 0.43 | 0.39 | 0.24 | 0.09 | ND | ND |
| Lead and Compounds (ppm) | 0.44 | 0.44 | 0.28 | 0.12 | 0.05 | ND |
| Lithium (ppm) | 0.18 | 0.63 | 0.54 | 0.50 | 0.3 | 0.26 |
| Potassium (ppm) | 55 | 94 | 57 | 72 | ND | ND |
| Rubidium (ppm) | 0.28 | 0.38 | 0.21 | 0.11 | 0.015 | 0.016 |
| Silver (ppm) | ND | ND | ND | ND | ND | ND |
| Sodium (ppm) | 90 | 88 | 72 | 76 | 0.58 | 45 |
| Thorium (ppm) | 0.15 | 0.17 | 0.16 | 0.20 | 0.15 | 0.19 |
| Zinc (ppm) | 29 | 120 | 78 | 57 | 77 | 63 |
| Fluoride (ppm) | 38 | 38 | 35 | 30 | 27 | 25 |

FIG. 5

L76 Limestone

| Calcination Temperature (2 hour soak) | Original | 1200 °C | 1300 °C | 1400 °C | 1500 °C | 1600 °C |
|---|---|---|---|---|---|---|
| Cadmium (ppm) | 0.43 | 0.87 | 0.76 | 0.72 | 0.46 | 0.22 |
| Cerium (ppm) | 1.1 | 2.1 | 2.1 | 2.0 | 2.0 | 1.9 |
| Cesium (ppm) | 0.40 | 0.03 | ND | 0.02 | ND | ND |
| Cobalt (ppm) | 0.7 | 0.14 | 0.12 | 0.14 | 0.12 | 0.11 |
| Copper (ppm) | 0.87 | 1.2 | 0.98 | 1.1 | 0.91 | 0.71 |
| Lead (ppm) | 0.42 | 0.5 | 0.3 | 0.13 | ND | ND |
| Lead and Compounds (ppm) | 0.46 | 0.98 | 0.65 | 0.76 | 0.41 | 0.25 |
| Lithium (ppm) | 0.48 | 0.98 | 0.65 | 0.76 | 0.41 | 0.25 |
| Potassium (ppm) | 57 | 90 | 65 | 31 | ND | ND |
| Rubidium (ppm) | 0.29 | 0.32 | 0.23 | 0.12 | 0.05 | 0.05 |
| Silver (ppm) | 0.06 | 0.09 | 0.07 | 0.06 | ND | ND |
| Sodium (ppm) | 170 | 140 | 140 | 130 | 100 | 66 |
| Thorium (ppm) | 0.15 | 0.34 | 0.32 | 0.31 | 0.28 | 0.25 |
| Zinc (ppm) | 13 | 26 | 25 | 26 | 22 | 20 |
| Fluoride (ppm) | 48 | 36 | 25 | 17 | 15 | 9 |

FIG. 6

METHODS FOR REMOVAL OF LEAD AND/OR OTHER CONTAMINANTS FROM LIMESTONE AND RESULTANT CALCIUM OXIDE

CROSS-REFERENCE TO RELATED APPLICATIONS

This application claims the benefit of U.S. Provisional Patent Application Ser. No. 62/807,556, filed Feb. 19, 2019, the entire disclosure of which is herein incorporated by reference.

BACKGROUND OF THE INVENTION

Field of the Invention

This disclosure is related to the field of calcium products manufacturing and more particularly to manufacturing calcium oxide and hydrated lime with a reduced amount of impurities, particularly lead.

Description of the Related Art

Calcium carbonate ($CaCO_3$), more commonly known as lime or limestone, is a naturally occurring sedimentary rock having a number of industrially useful applications usually due to it being a source for calcium. As with most substances, the practical and industrial uses of the substances are related to the chemical composition and structure of the substance. This is because the uses of the substances rely on the chemical composition in reactions.

In its naturally occurring form calcium carbonate is generally a chalky white-ish solid commonly referred to as limestone but there is substantial variation in color and brightness across limestone from different sources. In particular, variations based on the geographical region and the geological environment from which it is mined are common and expected. Similarly, calcium carbonate from mined sources is typically different from that of precipitated or manmade sources. While some limestone is naturally very white, others may have an ashen or gray tone or can be colored yellow or pink depending on mineral impurities present in the limestone. Due to the usefulness of calcium carbonate as a filler in paints, pigments, and paper, brighter white calcium carbonates are usually more commercially desirable and considered higher quality.

In practice, most substances we encounter in our everyday lives are not pure. Even filtered drinking water is not exclusively composed of $H_2O$, and contains some small amount of unwanted inclusions, as well as desired inclusions, such as fluoride. In practice, virtually no substance is completely "pure," and even artificially purified substances, such as precious minerals and metals, contain at least trace amounts of inclusions and impurities. Chemical purity is assessed on a case-by-case basis depending upon the particular substance in question, and how it is intended to be used. Calcium carbonate, particularly in its naturally occurring form of limestone, frequently contains a large number of inclusions and impurities, in large or small amounts. Common inclusions in limestone include magnesium, clay, silica, iron compounds, and sulfates. Some inclusions, in some quantities, are acceptable for certain uses, but others are problematic. Some of the more problematic materials in limestone can be minerals that are naturally darker, as these can lower the brightness of the limestone, and those that can cause problems for other chemical products made from calcium carbonate.

Two particularly useful chemicals made from naturally occurring calcium carbonate are calcium oxide (CaO), which is commonly known as quicklime and is typically used in making steel, cement, and other industrial products (as well as in some food applications), and calcium hydroxide or hydrated lime ($Ca(OH)_2$), which can be used in food additives, water purification, and pollution mitigation.

Typically both calcium oxide and calcium hydroxide are made from calcium carbonate. Specifically, ground calcium carbonate is heated (or calcined) in a lime kiln to a temperature above 825° C. to form quicklime (calcium oxide) in accordance with the following formula:

$$CaCO_3(s) \rightarrow CaO(s) + CO_2(g)$$

To form hydrated lime, the quicklime is typically subjected to fine grinding or milling to produce a finer material which can be of varying sizes in different embodiments. Any grinding or milling is suitable, including, for example, fine grind cage mill, swing hammer mill, screen mill, etc. where the amount of milling produces the desired particle-size distribution. Once a certain percentage of all the ground particles meet a desired size (e.g., 95% or smaller than 100 mesh), the ground quicklime meeting the desired size requirements is fed into a hydrator, where the calcium oxide reacts with water (also known as slaking), and is then dried (commonly in an environment relatively free of $CO_2$) to form calcium hydroxide in accordance with the following equation:

$$CaO + H_2O \rightarrow Ca(OH)_2$$

Finally, the resultant calcium hydroxide is then milled and classified until it meets desired criteria for its end use.

Impurities in the original limestone often are carried into the resultant calcium oxide and calcium hydroxide compositions which are produced above. Depending on the uses of these materials, certain impurities can create substantial problems. One such concerning impurity is lead which, if carried into resultant calcium hydroxide, can create problems in pollution mitigation compounds (since it is a controlled pollutant) and in food applications (as it is highly toxic to humans). However, as a naturally occurring substance, determining the amount of lead in original limestone can be problematic which can also result in concerns in determining the reduction of lead necessary to be performed to provide safe end products efficiently.

Further, while lead is a readily identifiable problematic inclusion, it is not the only one. For example, US Patent Application Publication 2007/0104630 and U.S. Pat. Nos. 2,021,663 and 2,127,626 (the entire disclosure of all of which are herein incorporated by reference) attempt to remove fluoride (another potentially problematic inclusion) from calcium oxide and hydrated lime.

While the above patents and applications provide for methods to reduce fluoride, this is only a single impurity that presents concerns. Therefore, there is a need in the art to purify limestone to reduce the mass of a number of impurities in a given mass of resultant calcium oxide and/or calcium hydroxide and particularly to remove lead.

SUMMARY OF THE INVENTION

The following summary of the invention is provided to give the reader a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented in a later section.

Because of these and other problems in the art, described herein, among other things, are systems and methods for impurity removal to limestone using modifications to the typical calcination process of turning calcium carbonate into calcium oxide. Traditional calcination of calcium carbonate has not been shown to remove certain heavier elements from the limestone compound, but an alternative process may be employed which does produce reduced content of certain heavy elements. Specifically, substantially increasing the temperature along with increases to soak time can result in reductions in lead and certain other heavier and/or problematic elements.

In an embodiment, there is described a method of calcining limestone comprising: providing limestone including calcium carbonate and impurities, said impurities including lead; and calcining said limestone to produce a calcium oxide composition, said calcining occurring at a temperature of 1100° C. or higher and having a soak time greater than 1 hour; wherein an amount of said lead in said calcium oxide composition is reduced compared to an amount of said lead in said limestone.

In an embodiment of the method, the calcining occurs at a temperature of 1200° C. or greater, 1300° C. or greater, 1400° C. or greater, 1500° C. or greater, or 1600° C. or greater.

In an embodiment of the method the soak time is 2 hours or greater.

In an embodiment of the method, the amount of said lead in said calcium oxide is no more than 75% said amount of said lead in said limestone, no more than 55% said amount of said lead in said limestone, no more than 25% said amount of said lead in said limestone, or undetectable.

There is also described herein, in an embodiment a method of calcining limestone comprising: providing limestone including calcium carbonate and impurities, said impurities including cadmium, cerium, cesium, cobalt, copper, fluoride, lead, lithium, potassium, rubidium, sodium, thorium, and zinc; and calcining said limestone to produce a calcium oxide composition, said calcining occurring at a temperature of 1100° C. or higher and having a soak time greater than 1 hour; wherein an amount of said impurities in said calcium oxide composition is reduced compared to an amount of said impurities in said limestone.

In an embodiment of the method, the calcining occurs at a temperature of 1200° C. or greater, 1300° C. or greater, 1400° C. or greater, 1500° C. or greater, or 1600° C. or greater.

In an embodiment of the method the soak time is 2 hours or greater.

There is still further described herein, a method of calcining limestone comprising: providing limestone including calcium carbonate and impurities, said impurities including fluoride; and calcining said limestone to produce a calcium oxide composition, said calcining occurring at a temperature of 1100° C. or higher and having a soak time of at least 2 hours; wherein an amount of said fluoride in said calcium oxide composition is reduced compared to an amount of said fluoride in said limestone.

In an embodiment of the method, the calcining occurs at a temperature of 1600° C. or greater.

BRIEF DESCRIPTION OF THE DRAWING

FIG. 1 shows certain impurity levels for limestone having various brightness levels.

FIG. 2 shows certain impurity data for high quality L70 brightness limestone originally and calcined at four different temperatures.

FIG. 3 shows impurity data comparing reductions for lower quality (<L60) limestone with higher quality (>L60) limestone for certain impurities calcined at four different temperatures.

FIG. 4 shows impurity data for a number of impurities for a low quality (L52) limestone. Two rows are highlighted illustrating the removal of lead alone and lead in conjunction with commonly controlled lead compounds (those provided in California Proposition 65).

FIG. 5 shows impurity data for a number of impurities for another low quality (L55) limestone. Two rows are highlighted illustrating the removal of lead alone and lead in conjunction with commonly controlled lead compounds (those provided in California Proposition 65).

FIG. 6 shows impurity data for a number of impurities for a high quality (L76) limestone. Two rows are highlighted illustrating the removal of lead alone and lead in conjunction with commonly controlled lead compounds (those provided in California Proposition 65).

DETAILED DESCRIPTION OF PREFERRED EMBODIMENTS

The present systems and methods relate to the purification of calcium oxides and any further resultant downstream materials made from those calcium oxides such as, but not limited to, calcium hydroxide, which are produced from limestone including impurities. The term "purify" in this context and application means to increase the degree of purity, which a person of ordinary skill will understand typically does not necessarily mean that the resulting compound is 100% pure and therefore purification of material herein does not mean to completely remove an impurity (although it can) but simply to reduce it's total amount by a commercially valuable and/or detectable quantity possibly to a value which is no longer detectable by current instruments used to evaluate material.

Further, "limestone" in this disclosure will generally mean a naturally occurring form of calcium carbonate ($CaCO_3$). As such, limestone, as a naturally occurring material, will typically not consist of pure calcium carbonate, but will comprise additional materials whose removal is desired and those materials will typically be different depending on specifics of where and how the limestone was obtained. It should be recognized, however, that "limestone" as that term is used herein can mean a manmade form of calcium carbonate which includes impurities (for whatever reason) and is desired to be purified. It should be recognized that while "calcium carbonate" as used herein will principally be used to refer to that specific material as a component of limestone, calcium carbonate may sometimes refer to both the specific compound and limestone at the same time.

Materials which are to be preferably removed are typically those which are considered dangerous to humans, which can cause lack of brightness, and/or which can create problematic reactions or byproducts when calcium oxide or downstream materials made from calcium oxide such as, but not limited to, calcium hydroxide are utilized in known or newly developed industrial processes. These materials will typically include, but are not limited to: cadmium, cerium, cesium, cobalt, copper, fluoride, lead, lithium, potassium, rubidium, silver, sodium, thorium, and zinc as well as chemical compounds of these materials such as, but not limited to, oxides and salts.

It should be understood that in order to perform purification on the outputs of limestone, it is first desirable to determine a baseline of how much impurity is originally present. In particular, limestone with higher lead content initially will generally show an increased reduction (as a literal amount) compared to a limestone with a reduced amount if a process is successful but this is by no means required. In an embodiment, a process will provide an end amount of impurity which is relatively independent of the amount of the impurity initially present but which amount is reduced but this is by no means required and the reduction may be of generally similar percentages regardless of the initial amount provided.

To determine a likely starting point for how high initial impurity levels are of certain target impurities that are to be removed, brightness is used as a general indicator of degree of impurity presence. Lower brightness can be, but is not necessarily, indicative that a limestone includes an increased number of impurities generally. However, testing of specific limestone will reveal specific impurities with concentrations of interest.

A commonly used scale for brightness in the United States is the TAPPI scale, also sometimes known as the GE scale. This standard was initially developed as a measure of diffuse blue reflectance, primarily for use in pulp bleaching, and was performed by early instruments, such as the General Electric (GE) Photovolt. This early association with GE has led to the industry shorthand "GE brightness" to refer to this measuring technique. GE brightness is generally a measure of the reflectivity of visible light (with a wavelength of about 457 nm) from a substance when observed at a 45° angle.

The Technical Association of the Pulp and Paper Industry (TAPPI) is now the keeper of this standard, and it is sometimes referred to as the TAPPI scale. Various TAPPI standards exist, including T452 and T457. This scale generally uses directional brightness. Because this measure depends on direction, variance in the results can be induced by the measurement angle. Other measures of brightness may be used as well, or instead, of the TAPPI/GE scale. For example, outside of the United States, diffuse brightness measures such as ISO C Brightness (ISO 2970-1, TAPPI T525) or ISO D65 (ISO 2970-2) are generally preferred. GE brightness is just one measure of products brightness or whiteness, and alternate tests include the "Hunter L" and "Hunter Y" scales among other measures. For sake of clarity, the directional brightness technique will be referred to herein as "GE brightness."

GE brightness for limestone can range substantially, but is typically around 80 on the GE scale (which measures from 1-100 with 100 being considered pure white) for fairly pure materials. This level of GE brightness is often interpreted as "light grey" in color. However, so-called "high-brightness" limestone can have a GE brightness often exceeding 90, while low brightness materials are often in the 40-60 range and can be a dark grey and are believed to include a large number of impurities.

As low brightness limestone is unusable for many common application of calcium carbonate (such as paper and paint production) it is often what is desired to be used in calcium oxide and calcium hydroxide production. However, often decreases in brightness are indicators that certain undesirable impurities are present in greater numbers as indicated above which can render that limestone unsuitable source material. This expectation is validated as shown in FIG. 1 which illustrates how low brightness limestone, using a Hunter-L score, typically have a higher quantity of lead and other undesirable impurities.

However, it should be recognized that brightness level, while a good proxy for total impurity levels, is not an exact, or sometimes even accurate, indicator of any particular impurity level. However, treatment methods which can work across a broader spectrum of initial inputs are often more commercially valuable as they can be used more ubiquitously. Therefore, brightness scores are used herein as an identifier for different types of limestone input having different levels of impurities to illustrate examples of how a variety of different limestone compositions can be purified.

Calcination, or the exposure of a compound to heat to create thermal decomposition, commonly serves to not only decompose the source compound, but can also be used to remove impurities from limestone. In some instances, impurities are simply vaporized and separate from the compound because the temperature is raised above their boiling point. In other instances, chemical bonds break down and the impurities separate out. Fluoride ($F^-$), for example, is known to be removable using calcination as is illustrated in, for example, U.S. Pat. Nos. 2,021,663 and 2,127,626. However, other impurities have previously not been responsive to removal via calcination. These include, but are not limited to: cadmium, cerium, cesium, cobalt, copper, lead, lithium, potassium, rubidium, silver, sodium, thorium, and zinc. Some of these impurities, such as lead, are harmful to humans and are an impurity whose removal is highly desired particularly if the calcium oxide is to eventually be used in the purification of water or in the food industry.

Calcination is, roughly speaking, a thermal treatment in which a compound is subjected to high temperatures in a typically low-oxygen environment, which results in thermal decomposition. Thermal decomposition is a chemical process in which a compound is "de-composed" from its constituent parts into its components by breaking chemical bonds. As described above, one of the most common applications of calcination is converting calcium carbonate to quicklime through the application of heat. Calcination is typically carried out in a furnace or reactor, sometimes also called a kiln or calciner.

Calcination typically takes place at the temperatures at which the compound in question breaks down. In chemical terminology, this is the temperature at which the standard Gibbs free energy for the calcination reaction is zero. For limestone calcination, this is approximated as $\Delta G°_r = 177,100-158\,T$ (J/mol), and the standard free energy of the reaction is 0 when the temperature is equal to 1121 K, or about 848° C. (1,558° F.). Thus, it is widely accepted that the ideal maximum firing temperature for limestone is around 900° C. (1,652° F.). A second component of calcination is the "soak" time. "Soaking" generally refers to the practice of maintaining the furnace at a maximum firing temperature for a specified period of time.

The present systems and methods comprise calcining a calcium carbonate source generally in a kiln at a higher temperature and generally longer soak time than has typically been used. This disclosure primarily concerns calcium carbonate in limestone, but may be applicable to any polymorph or other minerals or stone containing calcium carbonate, including, but not necessarily limited to, chalk, marble, and travertine.

The source calcium carbonate (typically as a part of a crushed or ground limestone) is calcined in the kiln, by raising the temperature to a predetermined maximum temperature, and then soaking the compound at that predetermined maximum temperature for a predetermined soak time. Whereas, in the prior art, the optimal temperature for calcination can be calculated to be a maximum of around 900° C., the present disclosure contemplates much higher temperatures of at least 1,100° C., at least 1,200° C., at least 1,300° C., at least 1,400° C., at least 1,500° C., or at least 1600° C. Without being limited to any one principle of operation, it is believed that these highly elevated temperatures cause heavier elements to vaporize, or otherwise break chemical bonds, causing the impurities to boil or fall out of the compound.

In an embodiment, the temperature is not only increased but the soak time is also additionally increased. Whereas a soak time of about one hour is standard in the industry for calcium carbonate calcination, in an embodiment, the soak time in the present systems and methods is about doubled to about two hours. In further embodiments, the soak time may be more than two hours and may be substantially increased depending on the target impurity to be removed.

Experimentally, the combination of elevated temperature and increased soak time achieves progressively lower amounts of heavy element inclusion, particularly lead, as temperature is increased. It is believed that this technique has similar implications for other elements, notably the mid-to-high period alkali metals, including, but not necessarily limited to, cesium, potassium, and rubidium. Some gains were also observed with silver and other potentially problematic impurities.

Multiple experiments were conducted using samples of limestone having a brightness of L70, a higher grade stone with fewer impurities of the target elements as illustrated in FIG. 1. The experiments were conducted at a longer soak time (about 2 hours) in all cases but at varying temperatures to assess the degree of purification achieved with varying temperature ranges. The experiment results are summarized in FIG. 2.

As shown in FIG. 2, at a calcine temperature of 1,100° C., the initial L70 sample yielded a product containing 0.41 ppm lead. At a calcine temperature of 1,200° C., the initial L70 sample yielded a product containing 0.31 ppm lead. At a calcine temperature of 1,300° C., the initial L70 sample yielded a product containing 0.19 ppm lead. At a calcine temperature of 1,400° C., the initial L70 sample yielded a product containing 0.13 ppm lead. However, the opposite effect was observed on certain other elements. For example, increases in content of certain other elements after calcination at the above temperatures was seen, notably in the first transition metals series 4 metals (e.g., iron, nickel, and titanium) although those results are not shown in FIG. 2. For this reason, the proposed methods and systems may not be suitable for removal of first transition metals while it may be suitable for removal of heavier metals and particularly mid-to-high period alkali metals.

It should be apparent that the ability to remove such impurities through calcination can be very valuable where calcination is to be performed anyway. For the generation of calcium oxide (or calcium hydroxide) from source calcium carbonate, calcination is a necessary step and the calcination contemplated herein utilizing higher temperatures and/or longer soak times allows for impurity removal without the need to expose the various materials to additional compounds or to additional processes which can often be both commercially undesirable and damaging to resultant compounds.

The system and methods contemplated herein can be performed using existing systems dramatically simplifying their use. Further, calcining can be performed in the higher temperature ranges and longer soak times. Calcining need not be performed by first raising the temperature to a lower or more traditional value (e.g. around 900° C.) and then later raising the temperature to that listed although that may be performed in alternative embodiments. Calcining, as shown in the discussed experiments, may be performed at the specifically listed higher temperature (e.g. above 1100° C.) simplifying the calcining process.

To determine if the impurity removal continues across a variety of different source calcium carbonate, calcination at the same temperature ranges and times as for the sample of FIG. 2 were performed on two samples of varying brightness levels (<L60 and >L60). It was expected that darker samples would have a higher level of inclusions, particularly of dark metals such as lead as indicated in FIG. 1. The present methods and systems clearly provide for increased removal of the listed target impurities, but it can also be noted that similar absolute levels of lead were also obtained for all three samples (those of FIGS. 2 and 3). This implies that the systems and methods contemplated herein can produce similar resultant materials regardless of input allowing the systems and methods to produce a relatively uniformly pure output material (with regards at least to lead) regardless of the impurity content of the initial limestone input. This is, however, not required.

Additional experiments were carried out and the results are shown in FIGS. 4, 5, and 6. In these tables the amounts of a number of compounds are provided but the focus (shown in the highlighted rows) was on lead specifically and the combination of lead and other lead compounds which are commonly thought to be harmful to humans. In the tables of FIGS. 4-6, the lead and lead compounds are those included in California's proposition 65 warnings as lead and lead compounds. FIGS. 4-6 also included further increased temperature ranges to determine if higher temperatures resulted in additional decreases.

As can be seen in FIGS. 4-6, lead and lead compounds were generally reduced in an increasing amount as temperature generally increased. Further, this reduction occurred in all three grades of source limestone. In many cases, the reductions were dramatic with lead not being detected ("ND") in the highest temperature calcination (1600° C.) in all three cases. Thus, reductions in lead to 75% or less, 50% or less, 25% or less, or to undetectable amounts are all possible. It, therefore, appears clear that high temperature calcination can provide for an increased purity of calcium oxide at least with regards to lead and lead compounds and can result in a generally complete removal of lead within the detectability of present instruments. It is expected that increased soak time could provide further increases, but longer soak times may not always be as commercially feasible as increased temperature.

FIGS. 4-6 also show a number of other important reductions. Cesium in particular also shows a near general increase in reduction as temperature generally increased. Cadmium, Potassium, and Rubidium also showed general reductions particularly at the highest temperature ranges. Further, at the end of each chart, reductions in fluoride are also noted. Fluoride reductions also showed a general increase in reduction as temperature increased indicating that the process of very high temperature calcination can server to reduce fluoride without the need to add additional compounds or calcine at a lower temperature and then perform impurity removal at a higher one.

Based on the above, it would appear clear that increased calcining temperature is an effective way to remove a number of impurities from calcium oxide and other products produced from limestone. The process can also be enhanced through increased soak time of 2 hours or more, 3 hours or more or 4 hours or more. Alternatively, increased soak time may be substitutable for additional increases in temperature. The processes appear particularly valuable for the removal of lead and lead compounds allowing even low quality natural limestone (as measured by brightness score) to be formed into calcium oxide or calcium hydroxide that may be suitable for industries where such materials were previously unsuitable.

While the above systems and methods are preferably used in the production of quicklime (calcium oxide) with reduced impurity load, particularly with regards to lead, this process can also be used to provide source quicklime for the production of lime hydrates with reduced impurity load which can make potentially lower brightness source limestone suitable as a feedstock for final product applications of calcium hydrates, such as food and water purification, where impurities such as lead may have previously rendered such feedstock unsuitable.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

Finally, the qualifier "generally," and similar qualifiers as used in the present case, would be understood by one of ordinary skill in the art to accommodate recognizable attempts to conform a device to the qualified term, which may nevertheless fall short of doing so. This is because terms such as "rectangular" are purely geometric constructs and no real-world component is a true "rectangular" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric or other meaning of the term in view of these and other considerations.

The invention claimed is:

1. A method of calcining limestone comprising:
providing limestone including calcium carbonate and impurities, said impurities including lead; and
calcining said limestone to produce a calcium oxide composition, said calcining occurring at a temperature greater than 1200° C. and having a soak time greater than 1 hour;
wherein an amount of said lead in said calcium oxide composition is reduced compared to an amount of said lead in said limestone.

2. The method of claim 1, wherein said calcining occurs at a temperature of 1300° C. or greater.

3. The method of claim 1, wherein said calcining occurs at a temperature of 1400° C. or greater.

4. The method of claim 1, wherein said calcining occurs at a temperature of 1500° C. or greater.

5. The method of claim 1, wherein said calcining occurs at a temperature of 1600° C. or greater.

6. The method of claim 1 wherein said soak time is 2 hours or greater.

7. The method of claim 1 wherein said amount of said lead in said calcium oxide is no more than 75% said amount of said lead in said limestone.

8. The method of claim 1 wherein said amount of said lead in said calcium oxide is no more than 55% said amount of said lead in said limestone.

9. The method of claim 1 wherein said amount of said lead in said calcium oxide is no more than 25% said amount of said lead in said limestone.

10. The method of claim 1 wherein said amount of said lead in said calcium oxide is undetectable.

11. A method of calcining limestone comprising:
providing limestone including calcium carbonate and impurities, said impurities including cadmium, cerium, cesium, cobalt, copper, fluoride, lead, lithium, potassium, rubidium, sodium, thorium, and zinc; and
calcining said limestone to produce a calcium oxide composition, said calcining occurring at a temperature greater than 1200° C. and having a soak time greater than 1 hour;
wherein an amount of said impurities in said calcium oxide composition is reduced compared to an amount of said impurities in said limestone.

12. The method of claim 11, wherein said calcining occurs at a temperature of 1300° C. or greater.

13. The method of claim 11, wherein said calcining occurs at a temperature of 1400° C. or greater.

14. The method of claim 11, wherein said calcining occurs at a temperature of 1500° C. or greater.

15. The method of claim 11, wherein said calcining occurs at a temperature of 1600° C. or greater.

16. The method of claim 11 wherein said soak time is 2 hours or greater.

17. A method of calcining limestone comprising:
providing limestone including calcium carbonate and impurities, said impurities including fluoride; and
calcining said limestone to produce a calcium oxide composition, said calcining occurring at a temperature of greater than 1200° C. and having a soak time of at least 2 hours;
wherein an amount of said fluoride in said calcium oxide composition is reduced compared to an amount of said fluoride in said limestone.

18. The method of claim 17 wherein said calcining occurs at a temperature of 1600° C. or greater.

19. The method of claim 17, wherein said calcining occurs at a temperature of 1300° C. or greater.

20. The method of claim 17, wherein said calcining occurs at a temperature of 1400° C. or greater.

* * * * *